United States Patent [19]
Blomquist

[11] 3,986,617
[45] Oct. 19, 1976

[54] INDEXING PALLET CARRIER FOR MACHINE TOOLS

[75] Inventor: Robert E. Blomquist, Rockford, Ill.

[73] Assignee: Sundstrand Corporation, Rockford, Ill.

[22] Filed: July 14, 1975

[21] Appl. No.: 595,338

[52] U.S. Cl. .............................. 214/1 BB; 29/563; 90/58 B; 198/339; 269/57; 408/71
[51] Int. Cl.² ...................... B23Q 3/02; B23Q 1/06
[58] Field of Search............. 214/1 BB, 1 BC, 95 R; 90/58 B; 408/71; 29/33 P, 563; 269/56, 57; 198/19

[56] References Cited
UNITED STATES PATENTS

| | | | |
|---|---|---|---|
| 2,672,773 | 3/1954 | Schofield | 269/57 |
| 3,049,032 | 8/1962 | Schabot | 269/57 X |
| 3,054,333 | 9/1962 | Brainard et al. | 90/58 B X |
| 3,238,615 | 3/1966 | Leone et al. | 29/563 X |
| 3,512,817 | 5/1970 | Attermeyer | 287/103 |
| 3,513,730 | 5/1970 | Lohneis | 408/71 X |
| 3,540,566 | 11/1970 | Perry et al. | 198/19 |
| 3,543,392 | 12/1970 | Perry et al. | 29/563 |
| 3,572,194 | 3/1971 | Cafolla | 214/1 BB |
| 3,628,400 | 12/1971 | Chope et al. | 74/826 |
| 3,825,245 | 7/1974 | Osburn et al. | 269/57 X |

FOREIGN PATENTS OR APPLICATIONS 1,018,849   2/1966   United Kingdom................... 269/57

Primary Examiner—Robert S. Ward, Jr.
Attorney, Agent, or Firm—Wegner, Stellman, McCord, Wiles & Wood

[57] ABSTRACT

A machine tool is provided with a traversing work table that has a mounting plate supported for vertical reciprocation and rotary indexing movement. A pallet is supported on the mounting plate and releasably locked to it by a bayonet connection with a clamp ring which is selectively rotatable in the mounting plate; and the pallet also has an annular toothed coupling meshed with a segmented annular toothed coupling in the base. Rotary indexing is permitted by elevating the mounting plate only enough to unmesh the toothed coupling. Elevating the mounting plate to a higher level releases the clamp ring from the mounting plate, and at that level the operation of a pallet changer rotates the clamp ring to release the pallet for removal from the mounting plate. Further, a rotatable cover has flanges that are normally between the segments of the toothed coupling on the base, and the cover rotates simultaneously with the clamp ring so the flanges overlie the toothed coupling segments during pallet changing.

21 Claims, 13 Drawing Figures

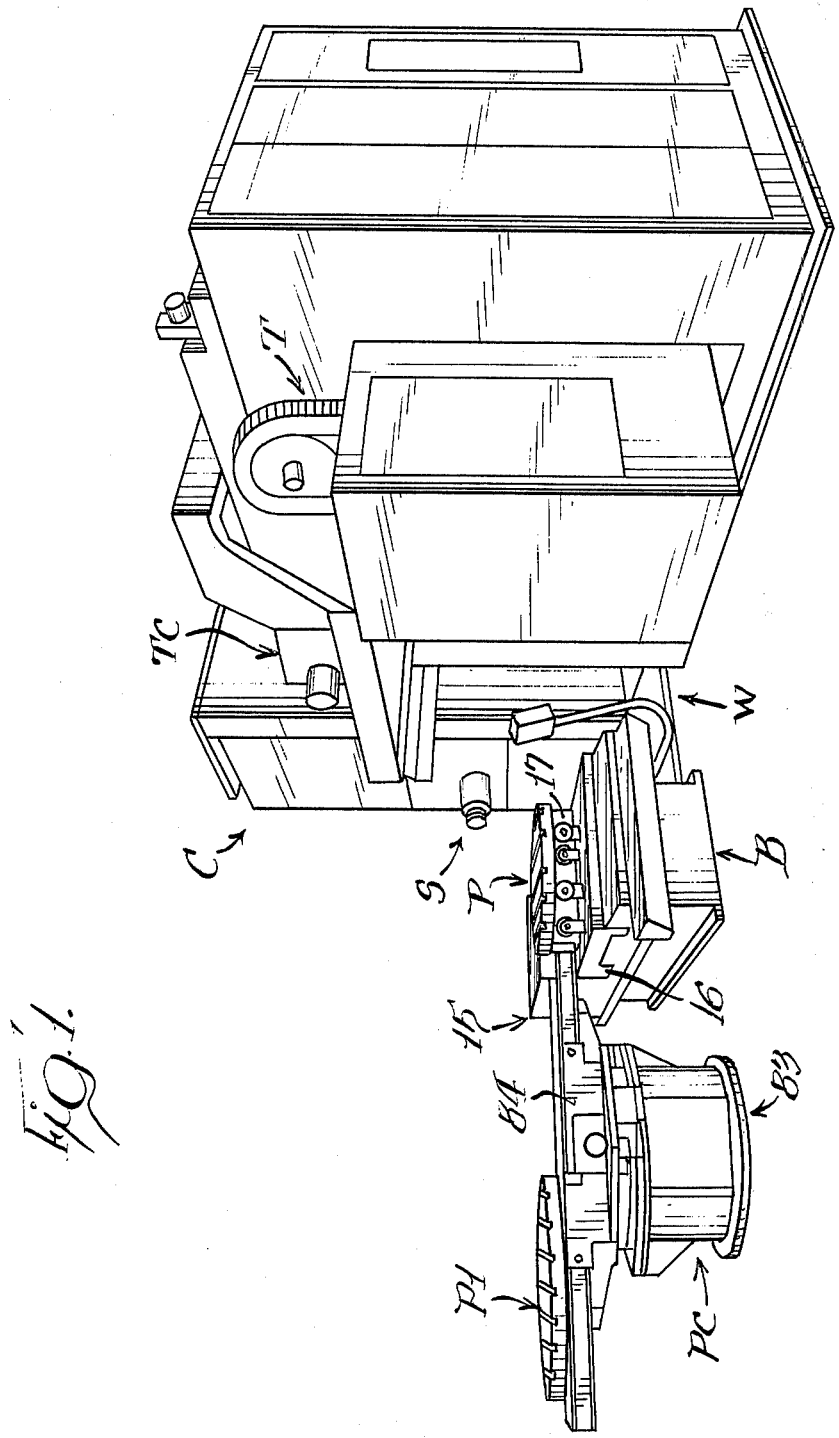

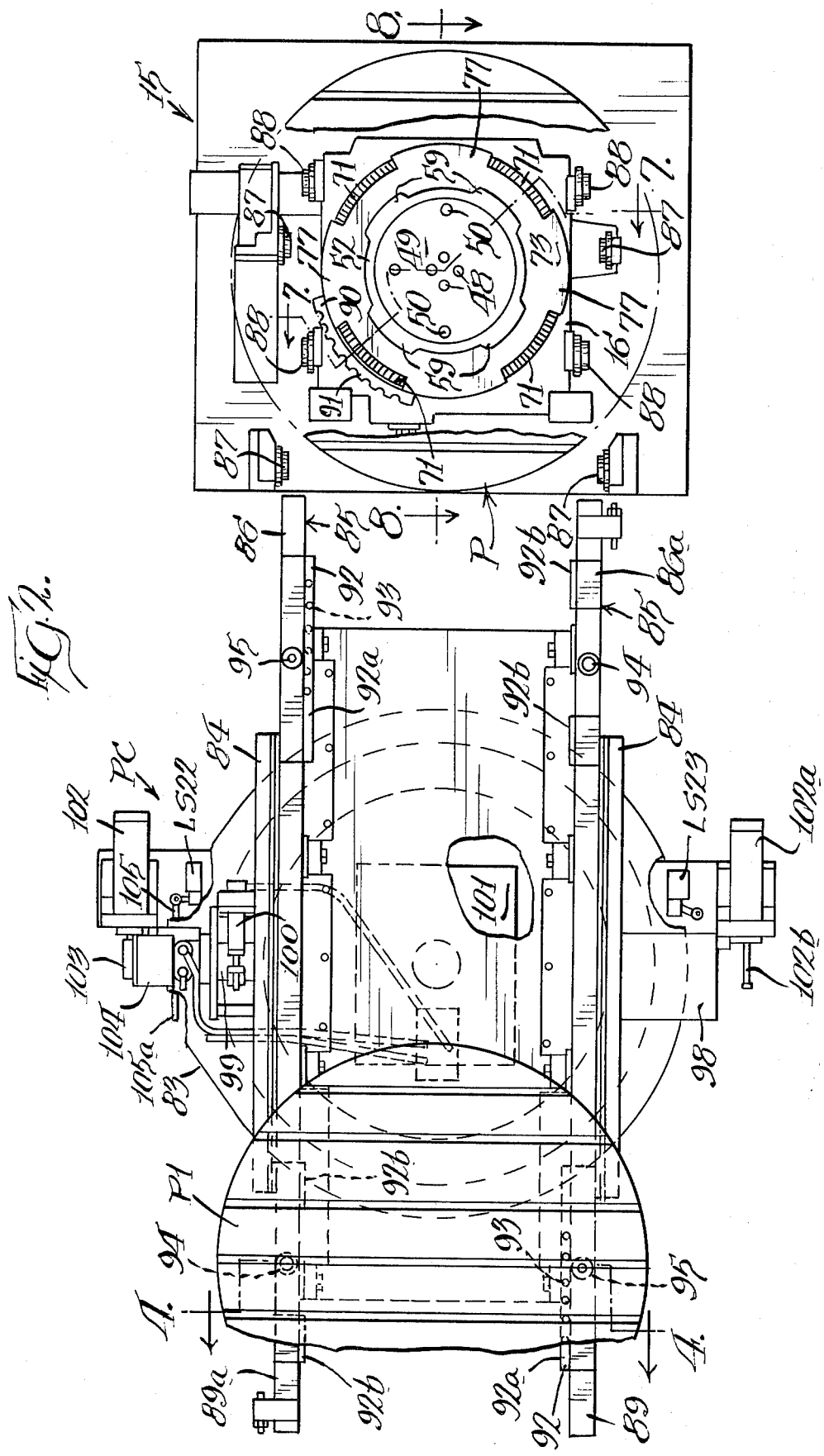

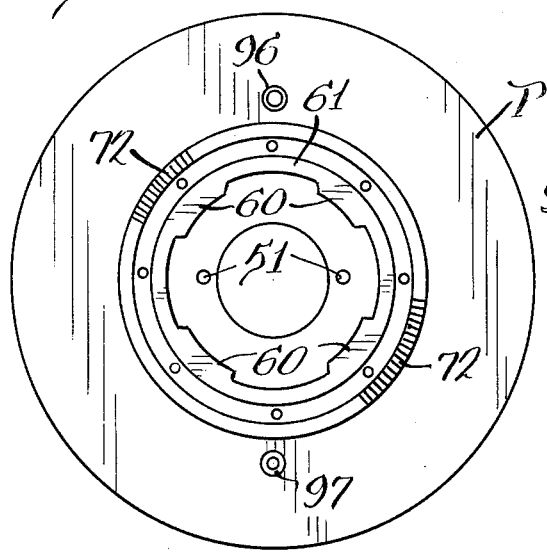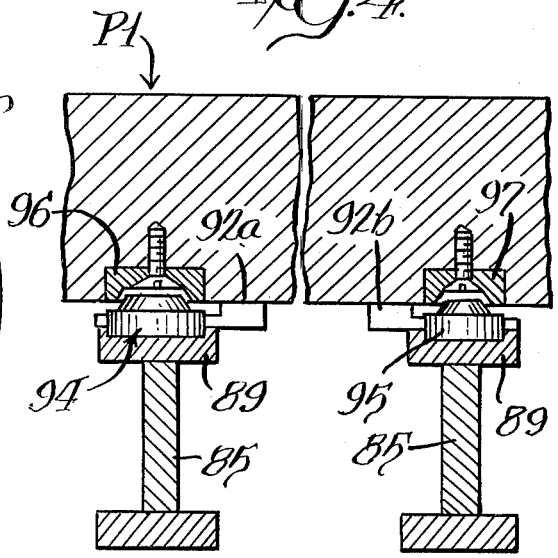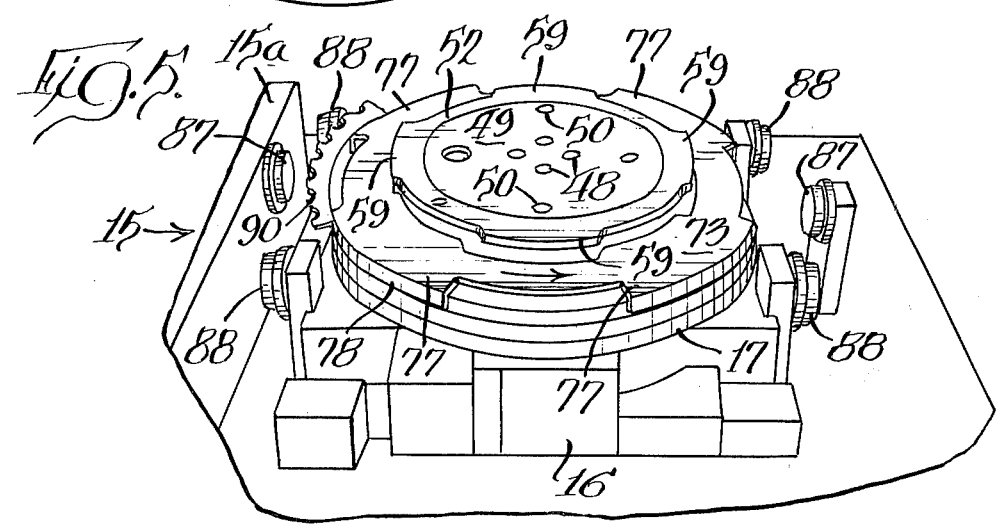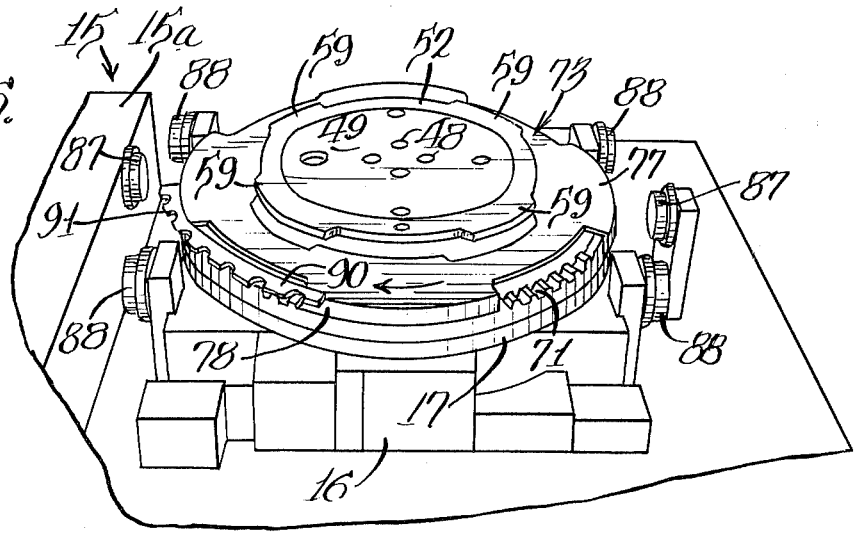

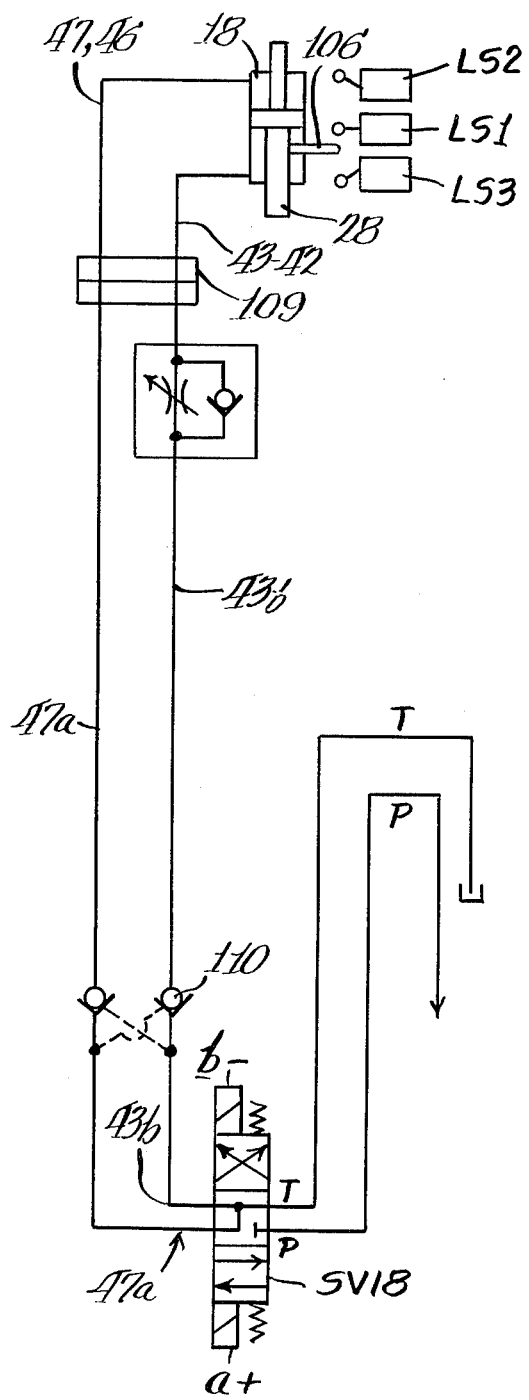
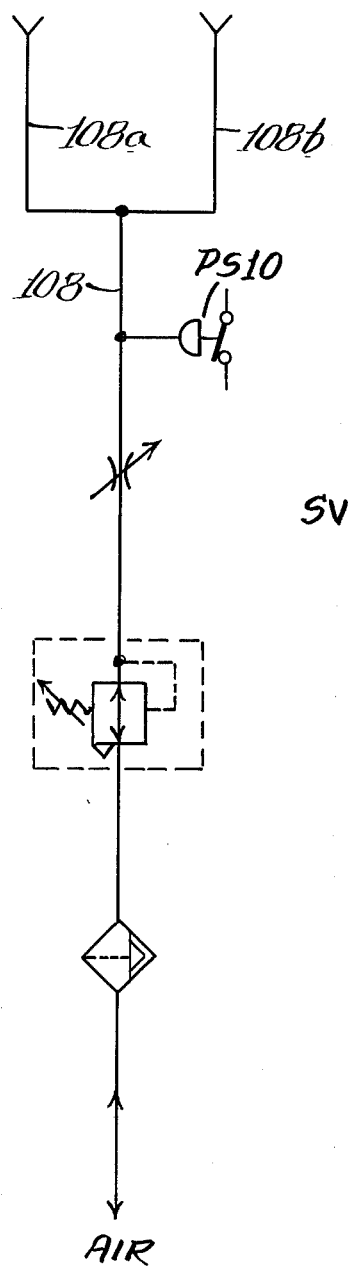
Fig. 10.   Fig. 11.   Fig. 12.

INDEXING PALLET CARRIER FOR MACHINE TOOLS

BACKGROUND OF THE INVENTION

Optimum utilization of high capacity machine tools such as milling machines requires that the work table be provided with interchangeable work supporting pallets and a pallet changer so that as soon as a machining operation is completed, a finished work piece fixtured on a pallet may be removed from the machine and a new work piece fixtured on a second pallet may be placed in the machine in the shortest possible time.

One of the absolute essentials of a machine tool work table which uses pallets is that the pallets must be firmly and accurately locked to the work table; and in the case of an indexing work table it is necessary that indexing of the table take place without disturbing the orientation of the pallets on the table. Positive indexing is customarily accomplished by the use of an annular toothed coupling which is preferably a Curvic coupling because of the particular tooth conformity of such couplings which causes a table to assume precisely the same angular and lateral location in spite of wear in the coupling teeth. The work table is arcuately indexed relative to the traversing base by elevating it sufficiently to disengage the coupling teeth and rotating it to the desired extent for the next operation.

However, where the indexing table carries a pallet, rather than directly supporting the workpiece, the need for precise positioning of the pallet with reference to the rotary indexing member has commonly resulted in the use of two Curvic couplings or suitable equivalents, with a first such coupling being used to locate the pallet with respect to an indexable mounting plate, and with the second being used to positively fix the position of the mounting plate relative to the traversing table base.

By reason of the foregoing structure, it has previously been necessary to provide two interfaces between the traversing table and the pallet, one such as a Curvic coupling between a pallet and a mounting plate, and another between the mounting plate and the work table base. This requires relatively complex mechanism.

Another problem in the use of Curvic couplings with pallet carrying indexing type work tables is the protection of the exposed, upwardly open coupling teeth from the time a pallet is removed until another pallet is in position and the coupling teeth are meshed.

SUMMARY OF THE INVENTION

In the present apparatus, a traversing work table carries a mounting plate which is supported for vertical reciprocating movement and rotary indexing movement. A clamp ring is rotatably supported in the mounting plate so that it may be turned through an angle of 45° about a vertical axis to make a bayonet type engagement with the underside of a pallet. Detent means on the mounting plate and on the underside of the pallet prevent the pallet from moving with the clamp ring.

The base of the work table has a segmented Curvic coupling which surrounds the mounting plate. It consists of alternate approximately 30° toothed segments and 60° gaps. An annular Curvic coupling member on the underside of the pallet meshes with the coupling segments on the base when the mounting plate is in a lowermost position which it occupies during a machining operation. In that position the clamp ring is locked against rotation in the mounting plate by a radially movable drive pin which impales the clamp ring and extends into a socket in the mounting plate.

A cover member which surrounds the clamp ring inwardly of the Curvic coupling has outwardly extending peripheral flanges which are in the 60° gaps between the toothed segments of the base coupling; and on the extreme outer periphery of the flanges is an arcuate segment having laterally extending teeth.

When a pallet is to be changed, the mounting plate is elevated to a predetermined level, and during this movement the drive pin rides over a cam surface which disengages it from the socket in the mounting plate and projects it into an opening in the cover member. This releases the clamp ring from the mounting plate and drivingly connects it to the cover.

The foregoing operations may occur only when the traversing table is at a "home" position, where it is aligned with a pallet changer. When the mounting plate with the pallet on it has reached the predetermined level, a pair of pallet changer rails is projected to move an empty end portion of the rails to a position beneath the peripheral portions of the pallet on the mounting plate; and during this movement a set of rollers on one of the rails engages with the laterally extending teeth on the cover member to rotate the cover member and the clamping ring 45°. This moves the cover flanges to positions overlying the toothed segments of the Curvic coupling element on the base, and simultaneously disengages the bayonet connection between the clamp ring and the pallet. Detent means on the mounting plate and the bottom of the pallet maintain location of the pallet.

The mounting plate, clamp ring and cover member are then lowered, leaving the pallet on the change rails, and permitting the cover flanges to rest upon the toothed segments of the Curvic coupling member on the base. It also, of course, disengages the laterally extending teeth on the cover from the rollers on the pallet changer rail so that when the rails are retracted to remove the pallet the clamp ring and cover member are not rotated.

After the pallet changer rails are retracted the changer is rotated to bring the opposite end of the rails, bearing a new pallet carrying a workpiece, adjacent the mounting plate so that the new pallet may be positioned above the mounting plate when rails are again extended.

When the new pallet is in position above the mounting plate, the latter is again elevated to lift the pallet off the rails and engage the laterally extending teeth on the periphery of the cover member with a set of rollers on one of the pallet changer rails. The rails are then retracted, and the rollers rotate the cover member and the clamp ring 45° to their original positions, thereby interengaging the bayonet connection on the clamping ring and the fresh pallet and also returning the cover flanges to a position above the gaps in the Curvic coupling on the base. When the pallet changer rails are fully retracted, the mounting plate is again lowered to its original position, and during this movement the radial drive pin rides off the actuating cam surface so that a drive pin spring returns the pin to its original position tieing the clamp ring to the mounting plate and disengaging it from the cover member. The Curvic coupling element on the bottom of the fresh pallet is engaged with the coupling segments on the base. This prepares the apparatus to commence a machining operation on the fresh workpieces.

When indexing of the pallet is required during a machining operation, the mounting plate is elevated just enough to disengage the Curvic coupling elements so that the mounting plate, the clamp ring and the pallet may be rotated as a unit to a new position, after which the mounting plate is lowered to re-engage the Curvic coupling elements.

The apparatus of the present invention is commonly used with a milling machine having numerical control which controls pallet indexing and moves the traversing work table to home position when an operation is completed. At this point the pallet changing operation may conveniently be carried out automatically by an electrohydraulic system which carries it through the entire pallet changing sequence and then reactivates the numerical control. The pallet changing operation is so described in the following detailed description; although it is apparent that if desired the pallet changing steps could be included in the numerical control program.

THE DRAWINGS

FIG. 1 is a perspective view of a multipurpose numerically controlled machining center with which the apparatus of the present invention is utilized;

FIG. 2 is a plan view with parts broken away of the traversing work table and pallet changer in the positions that they occupy immediately prior to a pallet changing operation;

FIG. 3 is a bottom plan view of a pallet;

FIG. 4 is a fragmentary sectional view on an enlarged scale taken substantially as indicated along the line 4—4 of FIG. 2;

FIG. 5 is a fragmentary perspective view of the traversing work table in the position that the pallet carrying piston, mounting plate and associated parts occupy after a first has been removed and before a second pallet is mounted;

FIG. 6 is a view similar to FIG. 5 illustrating the components of the apparatus in the position that they occupy when the piston has been elevated for removal of a pallet but before the clamping ring has been rotated;

FIG. 10 is a hydraulic circuit and electrical control schematic for the pallet carrying piston and mounting plate;

FIG. 11 is a pneumatic circuit for a pallet clamping sensor;

FIG. 12 is a pneumatic circuit for a pallet changer brake; and

DETAILED DESCRIPTION OF THE INVENTION

Figure 7:
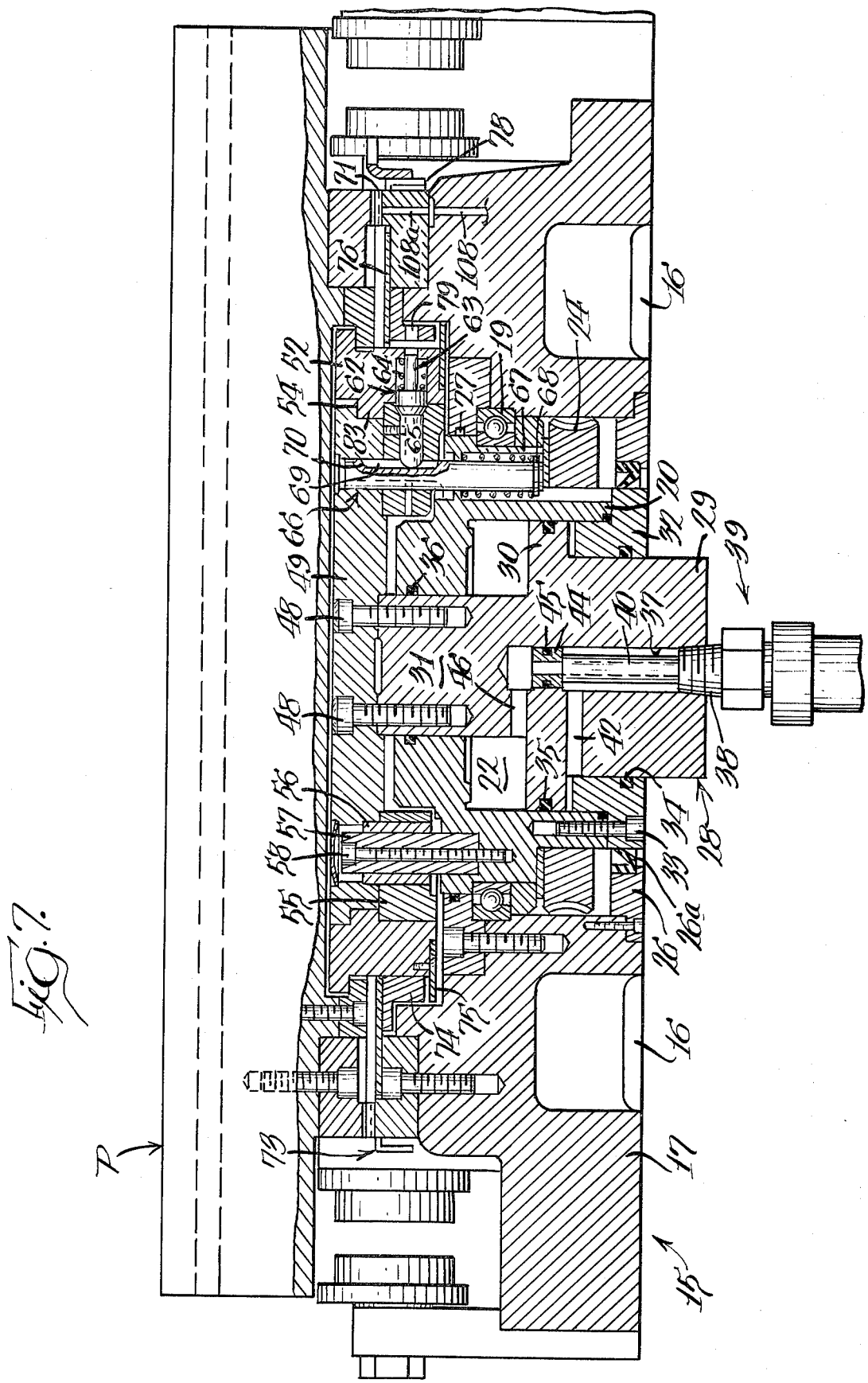
FIG. 7 is a sectional view an enlarged scale taken substantially as indicated along the line 7—7 of FIG. 2 with the components in the position that they occupy when a pallet is clamped for a machining operation.

I. General Description of a Machining Center Including the Invention

Referring to the drawings in detail, and referring first to FIG. 1, the invention is illustrated in conjunction with a machining center which includes a column, indicated generally at C, upon which a spindle head, indicated generally at S is mounted in ways for vertical movement to provide the Y-axis stroke of the machine. The column is mounted upon a wing base, indicated generally at W, providing the Z-axis stroke of the spindle head S. Adjacent the wing base and the column is a tool storage center, indicated generally at T; and tool changer means, indicated generally at TC, provides means for transferring tools between the tool storage T and the spindle head S.

A table base, indicated generally at B, supports a traversing work table, indicated generally at 15, which is mounted for movement along the table base B in front of the wing base W and column C to provide the X-axis, or table stroke. The traversing work table 15 is constructed to receive a pallet, indicated generally at P, as will be described in detail hereafter.

Alongside the table base B, on the side opposite the wing base W, is a pallet changer, indicated generally at PC, which is constructed and arranged to remove the pallet P from the work table 15 and place a fresh pallet P1 in a position to be connected to the work table as will be described in detail. The pallet changer PC is so located with respect to the table base B that when the work table 15 is at its home position and the pallet indexed to its home position, the pallet P is properly aligned with the pallet changer PC.

II. Detailed Description of the Work Table and Pallet

Referring now particularly to FIGS. 2, and 5 to 7, the work table 15 is carried upon rails (not shown) on the table base B; and includes a central pedestal structure, indicated generally at 16, on top of which there is a base 17.

Figure 8:
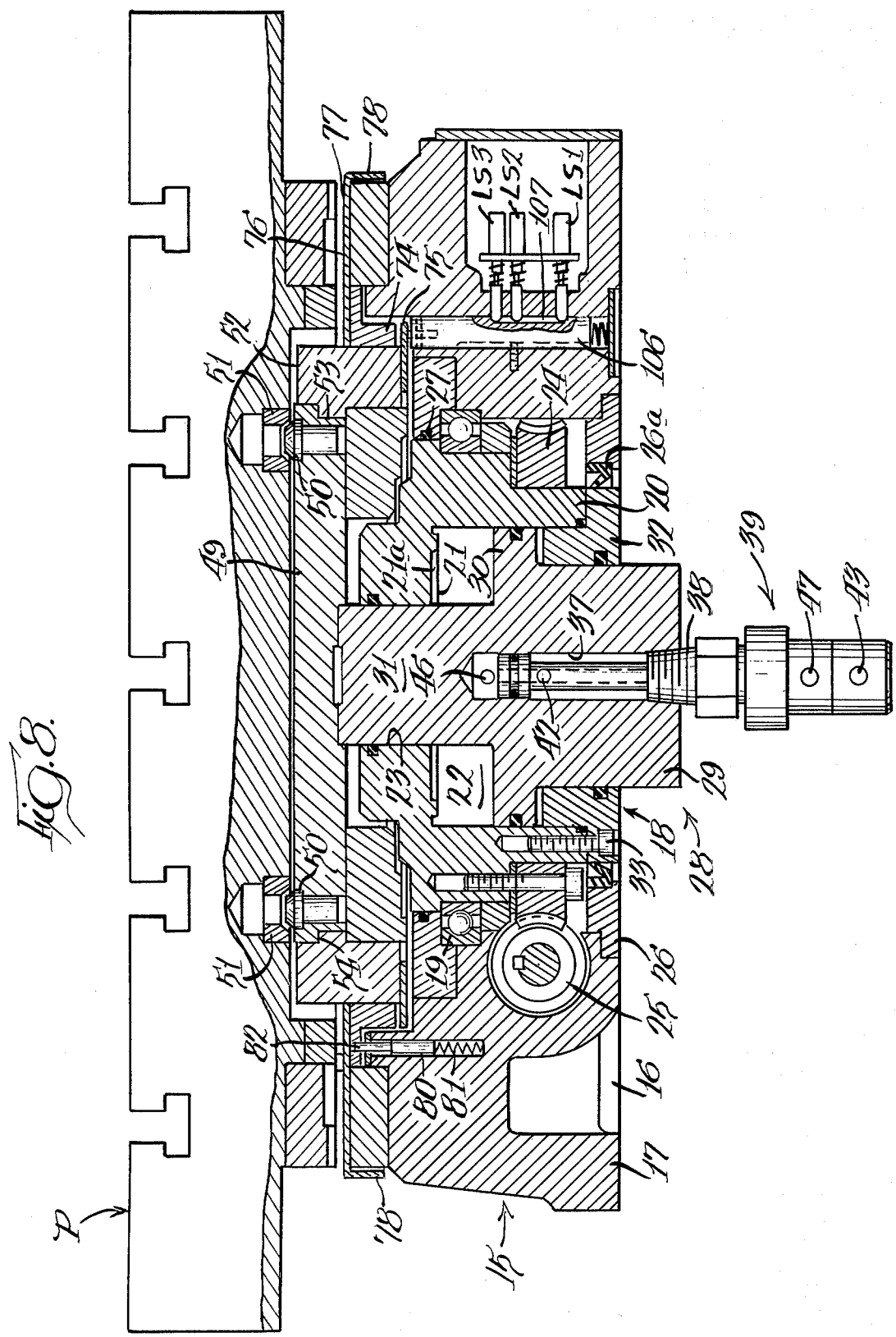
FIG. 8 is a sectional view taken substantially as indicated along line 8—8 of FIG. 2.
Figure 9:
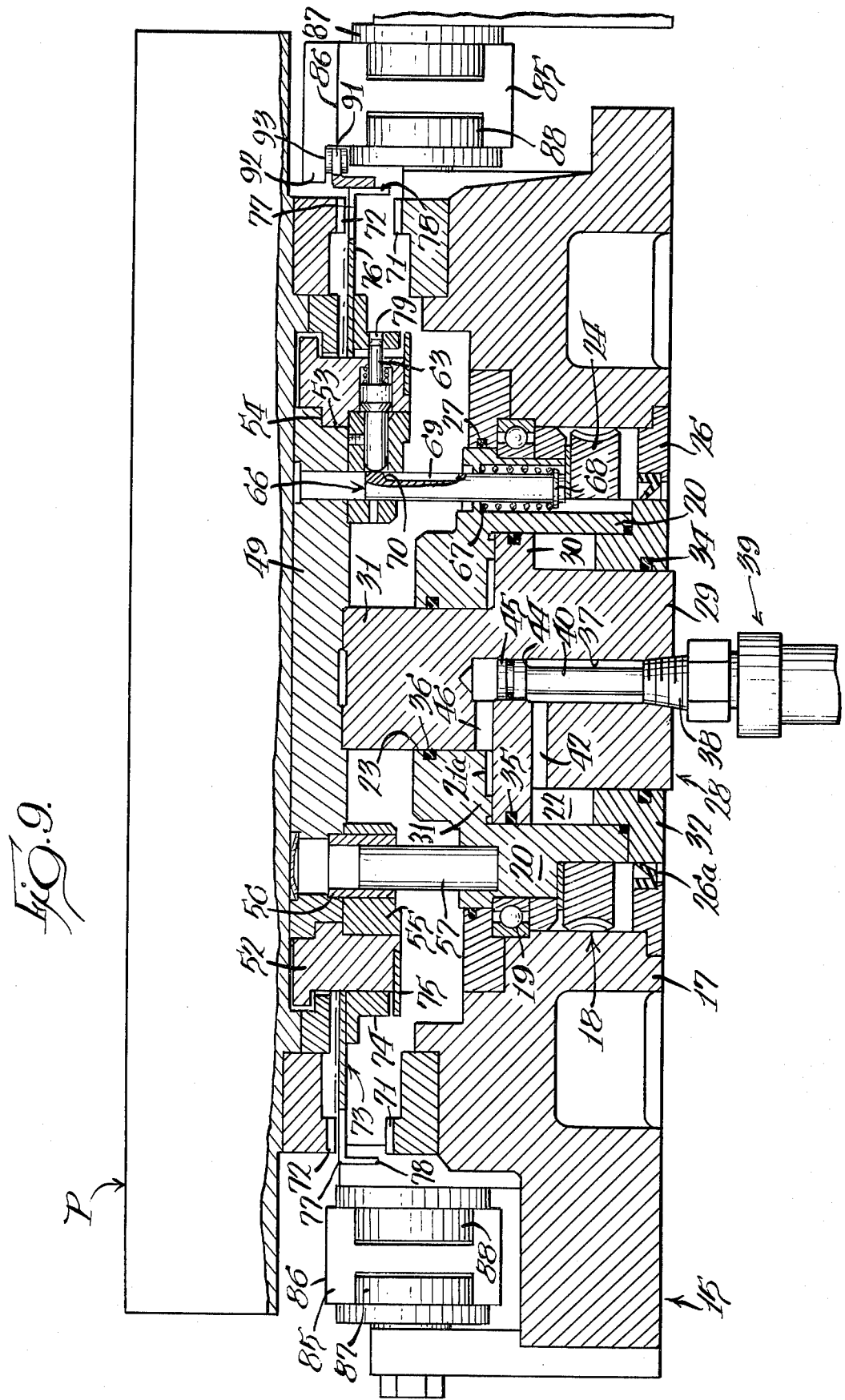
FIG. 9 is a view similar to FIG. 7 with the parts in the same position as is illustrated in FIG. 6.

Referring now particularly to FIGS. 7 to 9, the base 17 is annular and a cylinder, indicated generally at 18, is rotatably mounted in the central opening in the base in a ball bearing raceway 19. The cylinder has a sidewall 20 and a top wall 21 which define a chamber 22, and there is a central bore 23 in the top wall 21. Embracing the cylinder sidewall 20 is a gear 24 which is seen in FIG. 8 to be engaged by a worm 25, so that the cylinder 18 may be rotated in the base 17. A carrier ring 26 is mounted in the lower end of the central opening of the base and supports an annular seal 26a; and a seal 27 engages the piston sidewall 20 above the raceway 19.

Mounted in the cylinder chamber 22 is a piston, indicated generally at 28, which has a lower portion 29 of a first diameter, an intermediate portion 30 which is of larger diameter to make a sliding fit in the chamber 22, and an upper portion 31 which makes a sliding fit in the bore 23 in the cylinder top wall 21. A flanged ring 32 makes a snug sliding fit around the lower portion 29 of the piston 28 and is secured to the cylinder sidewall 20 by means of bolts such as the bolt 33 seen in FIGS. 7 and 8, so that it closes the lower end of the cylinder 22 and is externally sealed by the annular seal 26a. Sealing ring 34 in the flanged ring 32, sealing ring 35 in the piston portion 30, and sealing ring 36 in cylinder top wall bore 23 provide a fluid tight seal between the cylinder 18 and the piston 28. A sealing ring is also provided at the interface of cylinder sidewall 20 on ring 32.

A vertical bore 37 in the lower end of the piston 28 has a threaded lower extremity to receive a threaded hollow plug 38 of a hydraulic fitting, indicated generally at 39. As best seen in FIG. 9, the fitting 39 includes a tube 40 which is positioned in the bore 37 so as to define with the bore an annular hydraulic fluid passage which communicates with a transverse bore 42 that opens exteriorly of the piston portion 29 below the piston portion 30 so that hydraulic fluid admitted through an inlet passage 43 (FIG. 8) in the lower end portion of the fitting 39 can enter the cylinder chamber 22 between the flanged ring 32 and the piston portion 30 to elevate the piston from the position of FIGS. 7 and 8 to the position of FIG. 9.

The upper end portion of the tube 40 comprises an enlarged head 44 which is provided with a sealing ring 45 that seals the upper end portion of the tube in the upper end portion of the bore 37; and the tube 40 communicates with a lateral bore 46 which is in the upper piston portion 31 above the enlarged piston portion 30 so that hydraulic fluid admitted through a port 47 in the lower end of the fitting 39 may pass through the bore 46 and into grooves 21a which are formed in the cylinder top wall 21 so as to create a hydraulic pressure above the piston portion 30 for the purpose of returning the piston from the position of FIG. 9 to the position of FIGS. 7 and 8.

The control system for raising and lowering the piston 28 will be described hereinafter in conjunction with the entire control system for the pallet changing cycle.

As seen in FIG. 7, the upper end of the piston 28 is provided with vertical bores to receive machine screws 48 by means of which a circular mounting plate 49 is affixed to the top of the piston 28 so that functionally the piston and the mounting plate constitute a unitary structure. The pallet P is disposed above the mounting plate 49, and as seen in FIG. 8, studs 50 in the mounting plate have tapered portions projecting above the surface of the plate 49 to loosely engage with mating sockets 51 in the bottom of the pallet P, thus providing detent means which prevents movement of the pallet with reference to the mounting plate when those members are not otherwise locked together.

Referring again to FIGS. 2 and 7, a clamp ring 52 which surrounds the mounting plate 49 has an internal circumferential shoulder 53 which fits beneath a step 54 in the mounting plate 49, and a ring 55 which is secured to the underside of the mounting plate underlies the inner shoulder 53 on the clamping ring to maintain the ring 52 in its operative relationship with reference to the plate 49. As seen in FIGS. 7 and 9, at one side of the ring 55 is a vertical sleeve 56 which makes a friction fit in a hole in the ring 55 and slidingly receives a connecting pin 57 which is seated in a socket in an upper end portion of the cylinder sidewall 20, so that the piston 28 and the mounting plate 49 are tied to the cylinder 18 for rotation therewith.

The clamp ring 52 is seen in FIGS. 2, 5 and 6 to have four radially outwardly extending and overhanding clamp lugs 59 which form part of a bayonet type interconnection, the other part of which consists of radially inwardly extending locking flanges 60 of a pallet locking ring 61 which is seen in FIG. 3 to be on the underside of the pallet P. Since the interconnection between the clamp ring 52 and the pallet P is of the bayonet type, the flanges 60 are, of course, spaced from the underside of the pallet and have top surfaces with which the clamp lugs 59 of the clamp ring 52 are engaged by rotating the clamp ring in the mounting plate 49 when the pallet is seated upon the mounting plate with the detent means 50 and 51 engaged to restrain the pallet from rotating with the clamp ring.

Referring again to FIGS. 7 and 9, the clamp ring 52 is releasably engaged with the mounting plate 49 for selective rotation with the mounting plate or independently of the mounting plate. This is provided for by drive pin means, indicated generally at 62, which includes a radially movable drive pin 63, a drive pin spring 64, and a drive pin actuating plunger 65. The drive pin 63 has a shank which impales the clamp ring 52 and an enlarged head which is at the radially inner end of the shank and extends inwardly of the clamp ring 52 where it has a frusto conical extremity that seats in a chamfered recess that forms the outer end portion of a bore which extends through the clamp ring retainer 55 of the mounting plate 49. The drive pin actuating plunger 65 is slidably mounted in the last named bore, and has a rounded inner end that projects from the inner end of said bore. The drive pin spring 64 surrounds the shank of the drive pin and bears upon the base of the enlarged drive pin head so that the drive pin is normally engaged with the chamfered recess in the retaining ring 55, thereby tieing the clamp ring 52 to the mounting plate for rotary movement with the mounting plate.

Comparison of FIG. 7 with FIG. 9 shows how the drive pin 63 is disengaged from the mounting plate 49 when the mounting plate is moved from the lower, operating position of FIG. 7 to the elevated, pallet changing position of FIG. 9. Drive pin actuating means comprises a cam pin, indicated generally at 66, which is slidably mounted in aligned vertical bores in the mounting plate 49 and the retaining ring 55. The cam pin 66 has a lower end portion which extends into a well in the sidewall 20 of the hydraulic cylinder 18, and a compression spring 67 which surrounds the lower end portion of the cam pin 66 is seated against an annular flange at the top of the well and bears upon a peripheral flange 68 at the lower end of the cam pin so that the pin remains in a fixed position as the piston 28 and mounting plate 49 are reciprocated vertically. The cam pin 66 has longitudinal groove 69 which receives the rounded inner end of the drive pin actuating plunger 65, and at the upper end of the groove 69 is a cam surface 70 which is seen in FIG. 9 to be contacted by the rounded inner end of the plunger 65 when the piston and mounting plate have been elevated to the predetermined level shown in FIG. 9. This moves the drive pin 63 radially outwardly to disengage its enlarged head from the chamfered socket in the rataining ring 55, thus disconnecting the clamp ring 52 from the mounting plate 49 for independent rotation.

Referring now particularly to FIGS. 2, 3, 6 and 9, when the structure is in the position of FIGS. 7 and 8— i.e., the operating position which it occupies during a machining cycle — the pallet P is supported and firmly locked to the base 17 by a Curvic coupling means which includes toothed coupling segments 71 on the base and a mating toothed coupling ring 72 on the underside of the pallet P; the teeth of the pallet coupling ring 72 being meshed with those of the base coupling segments 71 when the apparatus is in said operating position. As seen in FIG. 2, each of the coupling segments 71 occupies an arc of approximately 30°, so the segments are separated by gaps, the angular extent of which is approximately 60°.

The use of coupling segments 71 on base 17 which are separated by gaps that are as large as the segments, or larger, permit the coupling segments to be protected when the pallet P is removed from the mounting plate 49 and the teeth of the segments 71 would otherwise be exposed to possible contamination by dirt and metal chips. This protecting is accomplished by cover means, indicated generally at 73 in FIGS. 5 to 9. The cover means 73 comprises a ring 74 which surrounds the clamp ring 52 and is confined by a laterally extending annular gib plate 75. A thin cover plate 76 extends radially outwardly from the ring 74 and has circumferentially spaced cover flanges 77 which extends further radially outwardly and have depending skirts 78. As seen in FIGS. 2 and 6, when the apparatus is in operating position the cover flanges 77 occupy positions in the gaps between the toothed segments 71; whereas, in the pallet changing position seen in FIG. 5 the cover flanges 77 overlie the toothed segments 71 on the base. The necessary rotary movement of the cover means 73 occurs simultaneously with rotary movement of the clamp ring 52 in the mounting plate 49, and in fact the clamp ring is driven by the cover means by reason of the fact that movement of the drive pin 63 to the position of FIG. 9 not only disengages it from the chamfered socket in the retaining ring 55, but at the same time projects the outer end portion of the pin shank into an aligned opening 79 in the cover means ring 74.

When the drive pin 63 is not engaged in the hole 79 the cover means 73 would be free to rotate relative to the clamp ring 52, due to vibration of the machine, if it were not a set of four stabilizing pins 80, one of which is seen in FIG. 8. The pins 80 are mounted in blind bores in the base 17, and springs 81 urge the pins 80 upwardly so that their upper end portions 82 are projected out of the base 17 into aligned holes in the cover means ring 74. The pins 80 are engaged with the holes in the cover means ring at all times except when the cover means is in the elevated position of FIG. 9 where, of course, it is prevented from rotating relative to the clamp ring 52 by the engagement of the drive pin 63 in the hole 79.

III. The Pallet Changer and Its Cooperation with the Traversing Work Table

As seen in FIGS. 1 and 2, the pallet changer PC consists generally of a base 83 surmounted by parallel guideways 84 which supports a pair of pallet carrying rails 85 that extend outwardly to both sides of the base 83 in planes that flank the lateral extremities of the cover means 73. As previously indicated, the rails 85 may be moved endwise from the position of FIG. 2 until the empty rail end portions 86 and 86a are beneath the overhanging side portions of a pallet P as illustrated in FIG. 9. In this movement the rails enter a passage defined by sets of rollers which are seen in FIG. 2 to include outer side rollers 87 and inner side rollers 88 which carry the load of the extended rails 85 and the pallet P when the latter is supported by the rails. End portions 89 and 89a of the rails 85 which are opposite the end portions 86 and 86a are seen in FIG. 2 to be supporting a fresh pallet P1 which may be moved into position for mounting upon the mounting plate 49 by rotating the pallet changer 180° from the position shown in FIG. 2 and extending the rails as previously described to position the pallet P1 above the mounting plate 49.

When the clamp ring 52 and cover means 73 are in the elevated position of FIG. 9, they are rotated by movement of the pallet changer rails 85. To accomplish this, the cover means 73 is seen in FIGS. 2, 5 and 6 to be provided with a peripheral arcuate segment 90 which has laterally extending teeth 91. Each of the rail end portions 86 and 89 is provided with an inwardly extending bracket 92 which supports a set of depending, spaced rollers 93 which function as teeth that interengage the laterally projecting segment teeth 91 as seen in FIG. 9. Thus, as the rails are extended as heretofore described to move their end portions 86 and 86a into the work table with piston 28 and mounting plate to rotate both the cover means 73 and the clamp ring 52 clockwise as indicated by the arrow in FIG. 6 so that they occupy the position illustrated in FIG. 5. Conversely, when the pallet changer rails are retracted with the apparatus in the position of FIG. 9, the rollers 93 rotate the cover means 73 and the clamp ring 52 counter-clockwise from the position of FIG. 5 back to the position of FIG. 6.

The pallet changer rails are provided at opposite ends with pallet support pads including an elongate pad 92a on bracket 92 and spaced shorter pads 92b on the opposite rail. As seen in FIGS. 2 and 4, the pallet changer rails 85 are provided with pallet indexing studs 94 and 95 which are of different sizes and shapes so that they fit, respectively, in unlike mating sockets 96 and 97 on the undersides of the pallets P and P1 so that a pallet may be placed upon the rails 85 in only one position.

The pallet changer per se is not a part of the present invention, and is described only to the extent necessary to provide a working structure and disclose its cooperation with the pallet support and the sequence of operations during pallet changing. A bi-directional rotary hydraulic motor 98 connected to a shaft 99 which extends entirely across the pallet changer and drives the rails 85 through a conventional rack and pinion mechanism. A clamp type brake 100 is normally spring urged into gripping engagement with the shaft 99 to lock the rails 85 in place except when a pallet change is to be made. Unlocking of the brake 100 will be described in conjunction with the control system for the pallet changing cycle.

A bi-directional hydraulic rotary oscillator 101 is mounted in the pedestal 83 and has a vertical shaft for indexing the pallet changer mechanism 180° as heretofore described. A pair of dash pots 102 and 102a are mounted at the two sides of the pallet changer pedestal 83 and dash pot plungers, such as the plunger 102b, are contacted by a buffer block 103 as the pallet changer approaches the limit of its 180° rotation in each direction.

A pair of mechanically linked rotary limit switch devices provide a limit switch structure 104 which is driven by the shaft 99, and the switches in the structure 104 cooperate in controlling the extension and retraction of the pallet changer rails and the raising and lowering of the pallet carrying piston 28. The rotary limit switch structure 104 includes seven limit switches (FIG. 13), of which three, namely LS20, LS21 and LS24, are involved in control of the pallet changing cycle. The remaining four limit switches of the structure 104 are utilized in decelerating the hydraulic motor 98 as the pallet changer rails 85 approach the end of their travel in both directions.

In addition to LS20, LS21 and LS24, the pallet changer has LS22 and LS23 (see also FIG. 2) mounted immediately inboard of the dash pots 102 and 102a where they may be actuated by adjustable pins 105 and 105a which actuate LS22 and LS23, respectively, as the pallet changer completes its 180° indexing in each direction.

In addition to LS20 through LS24, LS2 and LS3 (FIG. 8) participate in the control of the pallet changing cycle. LS1, also seen in FIG. 8, is utilized in conjunction with pallet indexing during a machining operation. LS1, LS2 and LS3 are all actuated by a vertical pin 106 that has a slot 107 that accommodates the tips of the plungers of LS1, LS2 and LS3. The pin 106 moves up and down with the piston 28 and associated vertically reciprocable parts so that movement of the pin 106 with respect to the limit switch plungers actuates the switches.

IV. The Control System and Sequencing of a Pallet Changing Cycle

Figure 13:
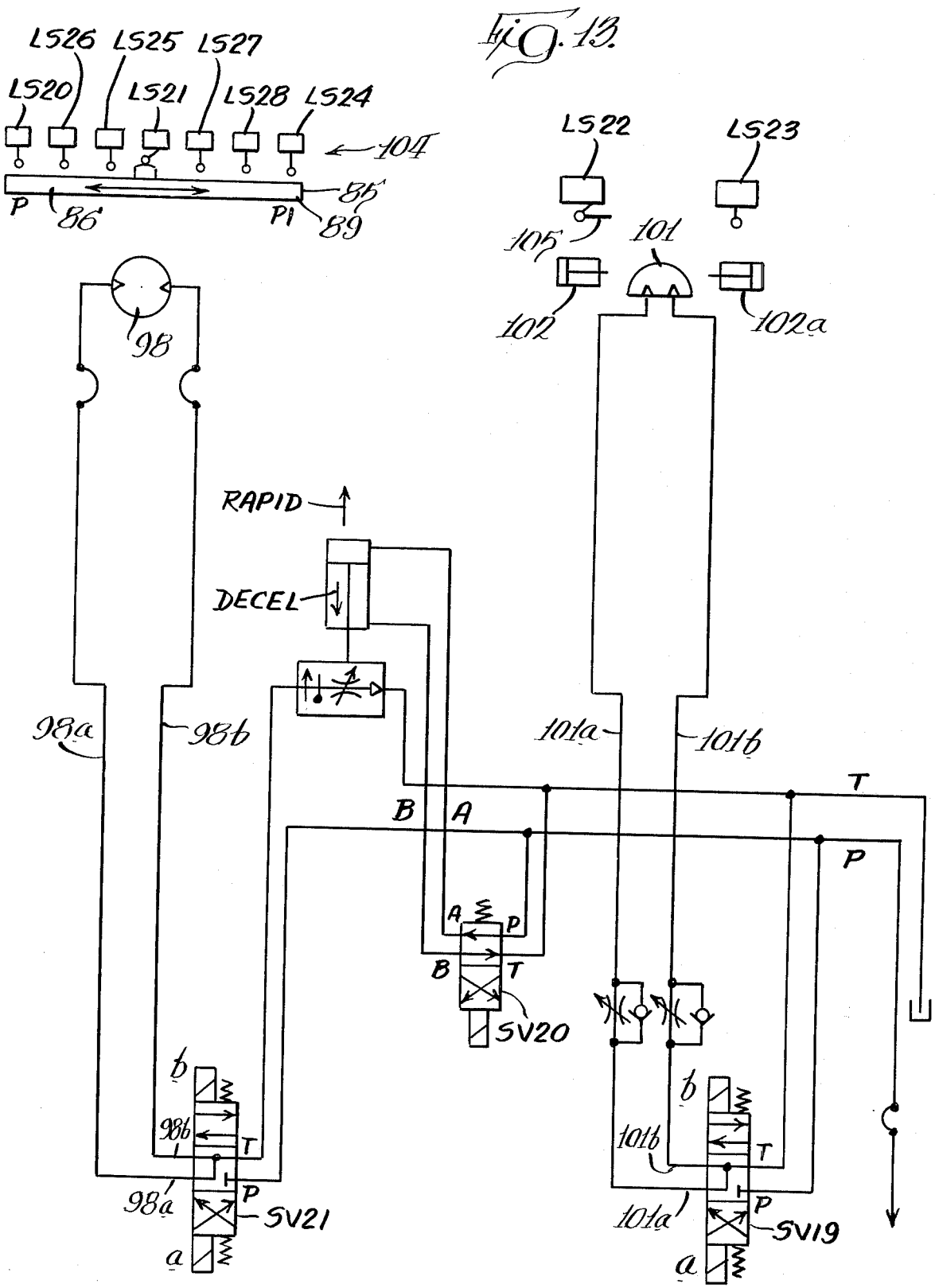
FIG. 13 is a hydraulic circuit and electrical control schematic for the pallet changer.

As illustrated in the drawings, including the hydraulic circuit and electrical control schematics for the pallet carrying piston and the pallet changer, the traversing work table 15 is in home position along the X-axis and on a narrow band limit switch (not shown). The cylinder 18 in the work table 15, and thus the piston 28 and the pallet P, are also rotationally in a home position, indicated by an encoder on the worm shaft 25, as will be explained. The piston 28 is down and the Curvic coupling means 71–72 clamped. As seen in FIGS. 2 and 13, LS22 is made by actuating pin 105; as seen in FIG. 13 the pallet changer rails 85 are in a central position such that LS21 is made; and as seen in FIGS. 8 and 10, the pin 106 is so positioned that LS1, LS2 and LS3 are all open. The brake 100 is clamped. A pressure switch PS10 (FIG. 11) is made by reason by back pressure in air line 108 which is seen in FIGS. 7 and 11 to have branches 108a and 108b which open into teeth of Curvic coupling segments 71. There is a constant flow of low pressure air through the line 108 toward the Curvic coupling 71, so that when the coupling is clamped, the blocking of the open ends of the lines 108a and 108b creates the back pressure which makes PS10. It is the making of PS10 which initiates a machining program for parts on a pallet and if at any time during machining PS10 drops out, the machine stops.

Referring again to FIG. 10, during machining operation a three position, four connection closed center solenoid valve SV18 has its solenoid a energized so as to connect to pressure a line 47a which connects through a rotary coupling 109 with the port 47 of the hydraulic fitting by means of which the pallet carrying piston 28 is lowered, and at the same time a line 43b from the hydraulic coupling port 43 is connected so that the cylinder 18 below the piston 28 is open through SV18 to the tank. Check valve 110 in line 43b is opened by pressure in line 47a. The pressure on piston 28 keeps the Curvic coupling teeth clamped during a machining operation, as heretofore described.

To initiate a pallet changing operation, solenoid a of SV18 is de-energized and solenoid b is energized so as to connect line 43b to pressure and line 47a to tank. This elevates the piston 28 and the mounting plate 49 to engage the pallet, and the pallet is elevated, to the limit of piston upward stroke and pressure is maintained, as heretofore described, until pin 106 makes LS2. Although it also necessarily makes LS1, the circuit to LS1 is de-energized except when pallet indexing is called for.

When LS2 makes, it energizes solenoid a of SV21 (FIG. 13) in order that hydraulic motor 98 may drive the pallet changer rails 85 to project the rail end portions 86 and 86a into position beneath the pallet P as heretofore described. As previously described, the rollers 93 on the rail end portion 86 engage the gear sector teeth 91 on the cover means 73 to rotate the cover means 45°; and this also rotates the clamp ring 52 to disengage the bayonet clamp lugs 59 from the locking flanges 60 on the underside of the pallet.

LS26, seen in FIG. 13, reduces the speed of the hydraulic motor 98, and the rails creep to the end of their travel against a positive stop (not shown). Pressure is maintained against stop until rail retraction is initiated. When pallet changer rails 85 reach the end of their travel, LS20 makes (FIG. 13) which de-energizes solenoid b of SV18 and again energizes solenoid a of SV18 to lower the piston 28, leaving the pallet P upon the pads 92a and 92b of pallet changer rail end portions 86 and 86a with the pallet orienting elements 96 and 97 on the bottom of the pallet engaged with the elements 94 and 95 on the rails 85. Since the pallet P is not longer upon the mounting plate 49, the piston 28 is free to travel downwardly below the position that it occupies when the Curvic coupling teeth are clamped, and this additional downward travel causes pin 106 to make LS3 which reverses the energization of SV21 to retract the rails 85. During return travel, LS25 causes deceleration until LS21 is again made, which stops the rails by de-energizing SV21.

As the piston 28, mounting plate 49, locking ring 52 and cover means 73 are lowered, the drive pin means 62 is disengaged from the cover means and re-engaged with the clamp ring retainer 55 of the mounting plate 49. The cover means 73 comes to rest upon the Curvic coupling segments 71 as seen in FIG. 5. The cover 73 is held against rotation by the four stabilizing pins 80 as heretofore described.

Making LS21 energizes SV19 (FIG. 13) to open one side of the rotary oscillator 101 to pressure and the other side to tank for the purpose of indexing the pallet changer rails 85 through 180° so that the pallet P1 is adjacent the traversing table 15 and the pallet P is in a position remote from the traversing table where work pieces on the pallet may be readily changed. The 180° rotation of the pallet changer releases LS22 and brings the adjustable actuating pin 105a into position to make LS23 (FIGS. 2 and 13); and making LS23 energizes SV21 to drive the hydraulic motor 98 in order to project the end portions 89 of the rails 85 and the pallet P1 into a position where P1 is centered above the mounting plate 49. LS28, seen in FIG. 13, reduces the speed of the hydraulic motor 98, and the rails creep to the end of their travel against a positive stop (not shown). Pressure is maintained against the stop until retraction of the rails is initiated. At the end of the travel of the rails 85 LS24 makes. This again reverses the energization of the solenoids for SV18 to elevate the piston 28 until the mounting plate 49 lifts the pallet P1 off the changer rail end portions 89 and 89a and re-engages the segment teeth 91 with the drive rollers 93 on the rail 89. When piston 28 is fully elevated, pin 106 makes LS2 which again reverses the energization of SV21 to retract the pallet changer rails 85. Actuation of LS27, causes deceleration until LS21 is again made, which stops the rails by de-energizing SV21. During retraction of the rails 85, of course, the rollers 93 on the rail end portion 89 act through the gear sector teeth 91 to rotate the cover member 73 and the clamp ring 52 through 45° and thus engage the bayonet clamp lugs 59 with the locking flanges 60 on the underside of the pallet P1. Such rotation also returns the cover flanges 77 into alignment with the gaps between the Curvic coupling segments 71.

When LS21 makes, it again reverses the energization of the solenoids of SV18 to lower the piston 28 and re-engage the Curvic coupling teeth. When the teeth are engaged, air flow through the line 108 is again blocked, as previously described, actuating PS10 to initiate the machining program for the part on the pallet P1. This completes the pallet changing cycle.

It is to be borne in mind, further, that the brake 100 which normally clamps the shaft 99 is opened by energization of the solenoid for SV22 (FIG. 12) whenever the pallet changer rails 85 are to be extended in either direction from the center position, and that each time LS21 remakes it de-energizes the solenoid of SV22 to return the brake 100 to its clamped condition.

Pallet indexing during a machining operation is carried out by the numerical machine tool control. When a pallet index is called for, solenoid $a$ of SV18 is de-energized and solenoid $b$ is energized to elevate the piston 28 only enough to disengage the Curvic coupling teeth —about ¼ inch. This makes LS1, which is de-energized except when indexing is called for, and the closing of LS1 operates a D.C. motor (not shown) which drives the worm gear 25 that acts through the gear 24 to rotate the cylinder 18, piston 28, mounting plate 49, clamp ring 52, and the pallet which is on the mounting plate 49 to the position required. An encoder (not shown) senses when the parts have reached the "called for" position; and the encoder has suitable internal gearing so that its rotor makes 1 revolution for each revolution of the pallet. A "key" pulse in the encoder revolution identifies the rotational "home" position of the pallet; and as previously stated a pallet change can take place only when the pallet is at home position as well as when the traversing table is at home position.

At the pallet indexing position, both solenoids of SV18 are de-energized so that hydraulic fluid on both sides of the piston 28 is blocked. Should leakage occur past the piston so that piston drops off LS1, solenoid $b$ of SV18 is again energized so as to raise the piston and again make LS1 which again de-energizes solenoid $b$ of SV18; so the operation is that of a bang-bang servo.

The foregoing detailed description is given for clearness of understanding only and no unnecessary limitations should be understood therefrom, as modifications will be obvious to those skilled in the art.

I claim:

1. In a machine tool, in combination:
   a traversing work table having a base;
   a mounting plate supported on said base for vertical reciprocating movement and rotary indexing movement;
   annular toothed coupling means on the base surrounding the mounting plate;
   a pallet seated on the mounting plate, the underside of said pallet having annular toothed coupling means meshed with the coupling means on the base;
   interengaging clamp means on the mounting plate and locking means on the pallet locking the latter onto the former;
   means for elevating the mounting plate to a predetermined level for disengaging said interengaging means to unlock the pallet from the mounting plate;
   and means for elevating the mounting plate to a first level below said predetermined level to unmesh the pallet coupling means from the base coupling means for unitary indexing movement of the mounting plate and the pallet.

2. The combination of claim 1 which includes driving means operable when the mounting plate is at said predetermined level to move the clamp means in one direction to disengage the clamp means from the locking means and in the opposite direction to engage the clamp means with the locking means.

3. The combination of claim 2 which includes movable means cooperant with said clamp means and with the mounting plate to selectively lock the clamp means to the mounting plate or release it for movement on the mounting plate, and means for moving said movable means in response to movement of said mounting plate to said predetermined level to release said clamp means for movement on the mounting plate.

4. The combination of claim 3 in which the clamp means commprises a clamp ring rotatably supported in the mounting plate, the movable means comprises a longitudinally slidable drive pin which impales the mounting plate and the ring, and the means for moving the movable means comprises a cam that is contacted by an end of said drive pin as the mounting plate is elevated to said predetermined level to slide the drive pin out of the mounting plate.

5. The combination of claim 4 which includes interengaged detent means on the mounting plate and the underside of the pallet to prevent movement of the pallet on the plate.

6. The combination of claim 4 in which the annular toothed coupling means on the base consists of a plurality of arcuate toothed segments separated from one another by gaps of arcs at least as large as said segments, and which includes rotatable cover means having peripheral flanges which normally overlie said gaps, and means for rotating the cover means simultaneously with rotation of the clamp ring to move said flanges over the segments when the pallet is disengaged from the mounting plate.

7. The combination of claim 6 in which the drive pin impales the cover means as it is moved endwise out of the mounting plate to tie the cover means to the clamp ring.

8. The combination of claim 6 in which the cover means is provided with a peripheral segment that has lateral teeth, and the driving means engages said lateral teeth to rotate the cover plate and the clamp ring.

9. The combination of claim 8 which includes a pallet changer with which the work table may be aligned, longitudinally extensible pallet carrying rails on the pallet changer for placing pallets on the mounting plate and removing them therefrom, and in which the driving means comprises a toothed rack on one of said rails which meshes with said lateral teeth when the mounting plate is at said predetermined level.

10. The combination of claim 1 which includes a pallet changer adjacent the work table, said pallet changer having a base, a head rotatably mounted on said base, first and second pairs of rails movably mounted on said head for longitudinal reciprocation between an extended position and a retracted position, said pairs of rails extending in different directions from the head, means for rotating said head on the base to move either of said pairs of rails into alignment with the work table so that extension of the aligned pair of rails moves it to a supporting position beneath the marginal portions of a pallet on the work table, driving means on a rail of each pair which operatively connects with the clamp means to disengage said clamp means from a pallet as said pair of rails is extended with the mounting plate at said predetermined level and to engage said clamp means with a pallet as said pair of rails is retracted with said mounting plate at said predetermined level, and means for causing the apparatus to function in a pallet changing cycle in which
 a. the mounting plate is elevated to said predetermined level,
 b. a first, empty, pair of rails is moved to supporting position, thereby disengaging the clamp means from the pallet,
 c. the mounting plate is lowered, leaving the pallet supported on the first pair of rails,
 d. said first pair of rails is retracted, carrying the pallet,
 e. the pallet changer head is rotated to align the second pair of rails, carrying a new pallet, with the work table,
 f. said second pair of rails is extended to position said new pallet above the mounting plate,
 g. the mounting plate is elevated to said predetermined level and lifts said new pallet off the second pair of rails,
 h. the second pair of rails is retracted, thereby engaging the clamp means with the pallet,
 i. the mounting plate is lowered.

11. The combination of claim 10 in which the clamp means comprises a clamp ring rotatably supported in the mounting plate, movable means cooperant with said clamp ring and with the mounting plate to selectively lock the clamp ring to the mounting plate or release it for rotation in the mounting plate, and means for moving said movable means in response to movement of the mounting plate to the predetermined level to release the clamp ring for rotation.

12. The combination of claim 11 in which the driving means comprises a rack on one of the rails of each pair of rails, and in which an arcuate segment which is operatively connected with the clamp ring has lateral teeth with which each of said racks meshes when the rails are extended and retracted with the mounting plate at the predetermined level.

13. The combination of claim 12 in which the annular toothed coupling means on the base consists of a plurality of arcuate segments separated from one another by gaps of arcs at least as large as said segments, which includes rotatable cover means having peripheral flanges which normally overlie said gaps, and means for selectively tieing the cover means to the clamp ring when said ring is released from the mounting plate, and in which the arcuate segment is mounted on the periphery of the cover plate flanges.

14. The combination of claim 13 in which the movable means cooperant with the clamp ring and mounting plate comprises a longitudinally slidable pin which impales the mounting plate and the ring, and in which the means for moving the movable means comprises a cam that is contacted by an end of said pin as the mounting plate is elevated to said predetermined level to slide the pin out of the mounting plate and into a hole in the cover means.

15. In a machine tool, in combination:
 a traversing work table having a base with a central vertical opening;
 a circular mounting plate supported in said opening for vertical reciprocating movement and rotary indexing movement;
 a clamp ring surrounding and carried by said mounting plate, said clamp ring being rotatable about the mounting plate;
 a radially movable drive pin impaling the clamp ring and extending into a socket in the plate for selectively locking said ring to the plate or releasing it for rotation about the plate;
 means for moving said drive pin to release the ring in response to upward movement of the plate and ring to a predetermined level;
 annular toothed coupling means on the base surrounding the ring;
 a pallet, the underside of said pallet having annular toothed coupling means meshed with the coupling means on the base, and said underside also having locking means which is selectively engaged or disengaged by the clamp ring upon rotation of said ring in opposite directions;
 means for elevating the plate to a first level below said predetermined level to unmesh the pallet coupling means from the base coupling means for unitary indexing movement of the mounting plate, clamp means and pallet;
 means for elevating the plate to said predetermined level to release the clamp ring for rotation on the plate;
 and means operatively connectable with said clamp ring to rotate it for engaging or disengaging the pallet locking means when the plate is at said predetermined level.

16. The combination of claim 15 which includes detent means on the plate and on the underside of the pallet to prevent movement of the pallet on the plate.

17. The combination of claim 16 which includes a pallet changer adjacent the work table, a pair of rails on said pallet changer which are adapted to support a pallet, means for reciprocating said rails longitudinally between an extended position beneath the marginal portions of a pallet on the mounting plate and a retracted position, and means on said pair of rails which operatively connects with the clamp ring to disengage it from a pallet as the pair of rails is extended with the mounting plate at said predetermined level and to engage said clamp means with a pallet as the pair of rails is retracted with said mounting plate in said predetermined position.

18. In a machine tool, in combination:
 a traversing work table having a base;
 a mounting plate supported on said base for vertical reciprocating movement and rotary indexing movement;
 annular toothed coupling means on the base surrounding the mounting plate, said coupling means consisting of a plurality of arcuate toothed segments separated from one another by gaps of arcs at least at large as said segments;
 a pallet seated on the mounting plate, the underside of said pallet having annular toothed coupling means meshed with the coupling means on the base;

a clamp ring which is rotatable in the mounting plate and interengaged with locking means in the bottom of the pallet;

means for elevating the mounting plate to a predetermined level;

means operable when the mounting plate is at said predetermined level to rotate the clamp ring for disengaging it from the pallet;

and rotatable cover means having peripheral flanges which normally overlie the gaps in the coupling means on the base, said cover means being rotatable simultaneously with the clamp ring to move said flanges over the toothed segments when the pallet is disengaged from the mounting plate.

19. The combination of claim 18 which includes a radially movable drive pin impaling the clamp ring and extending into a socket in the mounting plate for selectively locking said ring to the plate or releasing it for rotation in the mounting plate, an aperture in the cover means aligned with said drive pin, and means for moving said drive pin in response to upward movement of the mounting plate and ring to said predetermined level to move it out of the socket in the mounting plate and into the hole in the cover means.

20. The combination of claim 19 in which the means operable to rotate the clamp ring includes an arcuate peripheral toothed segment on the cover plate and driven rack means drivingly engageable with said toothed segment when the mounting plate is at the predetermined level.

21. In a machine tool, in combination:
a traversing work table having a base;
a mounting plate supported on said base for vertical reciprocating movement and rotary indexing movement;
annular toothed coupling means on the base surrounding the mounting plate;
a pallet seated on the mounting plate, the underside of said pallet having annular toothed coupling means meshed with the coupling means on the base;
interengaging clamp means on the mounting plate and locking means on the pallet locking the latter onto the former;
and means for elevating the mounting plate to unmesh the pallet coupling means from the base coupling means.

* * * * *